United States Patent Office 2,892,683
Patented June 30, 1959

2,892,683
PROCESS OF PRECIPITATING AND FILTERING MAGNESIUM HYDROXIDE

Giacinto Veronica, Milan, Italy, assignor to Montecatini Società Generale per l'Industria Mineraria e Chimica, a corporation of Italy No Drawing. Application July 1, 1954
Serial No. 440,849

Claims priority, application Italy July 8, 1953

7 Claims. (Cl. 23—201)

The present invention relates to a new process of precipitating and filtering magnesium hydroxide, resulting in an increased operation speed and in a product of greater purity.

Ordinarily, the filtration and washing of $Mg(OH)_2$ precipitates is difficult because of the particular jellylike structure of these precipitates. A review of the pertinent literature shows that numerous processes have been suggested in order to overcome these difficulties; for instance, the addition to the precipitant (generally in form of a lime slurry) of alkaline-earth nitrates, alkaline chlorates or calcium chloride; employment of various flocculating agents, almost all derived from plant sources; or the use of precipitation reactants in the form of grains of definite particle size.

While the overall operation time may be reduced by these expedients, substantial periods of time are still required for the filtration which, in addition, generally requires the application of heat. According to recent findings, the precipitation reaction occurs in two steps according to the following scheme:

(1) $2MgCl_2 + Ca(OH)_2 = 2MgOHCl + CaCl_2$
(2) $2MgOHCl + Ca(OH)_2 = 2Mg(OH)_2 + CaCl_2$

By employing a molar ratio $MgCl_2:CaO$ equal to 1:0.75 and by restricting the time of the reaction between lime and magnesium chloride to a period from 3 to 5 minutes, the product obtained consists chiefly of the unstable oxychloride which, owing to its granular structure, may be readily filtered.

The reaction goes to completion on the filter within about half an hour and the resulting $CaCl_2$ can be removed by continuous washing with water. However, as the magnesium salt slowly goes into $Mg(OH)_2$ the filtration difficulties peculiar of this product increase. The washing operation becomes progressively slower and the complete removal of the Ca ion from the filter cake becomes practically impossible within a reasonable time.

The average composition of the product obtained according to this process is as follows:

(Moist): $H_2O$—76.8%; Cl—0.9%; Ca—0.1%; $Mg(OH)_2$—21.6%
(Dry): Cl—3.9%; Ca—0.4%; $Mg(OH)_2$—93%

It is an object of the invention to greatly increase the filtration rate of the above-mentioned $Mg(OH)_2$ precipitates.

To this end, and in accordance with a feature of the invention the precipitation from a soluble Mg salt, effected with the aid of an alkaline solution or suspension, is carried out in the presence of an appropriate amount of a synthetic polyelectrolyte. More specifically, the polyelectrolyte is a synthetic organic polymer which, when dissolved in a solvent of a high dielectric constant, produces polyvalent ions of positive or negative character. Such a polyelectrolyte may have a molecular weight from 5,000 to 300,000.

The amount of the polymer to be added depends upon the specific activity of the polymer itself and upon the time required for the reaction between the magnesium salt and the precipitating reactant. Generally, if it is desired to filter and wash the precipitate completely free of calcium within a reasonably short time, amounts corresponding to from 0.2 to 1% of the resulting dry $Mg(OH)_2$ are needed. If only a shortening of the settling time is desired, it suffices to add amounts from 0.2 to a maximum of 0.5% based on dry $Mg(OH)_2$.

In the following examples, a comparison is made between the rates of filtration and decantation of $Mg(OH)_2$ precipitates obtained either in the presence or in the absence of polyelectrolytes after various reaction times between the magnesium salt and the precipitating agent.

Example 1

While stirring vigorously, 50 ml. of a 280 gram per liter (g./l.) $MgCl_2$ solution are rapidly added, at room temperature, to 24.5 g. of a 40% $Ca(OH)_2$ suspension, passed through a 270 mesh screen. The molar ratio $MgCl_2:CaO$ is 1:0.9.

After stirring for 3 minutes, the precipitate is filtered under vacuum upon a Buchner filter (9 cm. diameter) and the filter cake is washed with 150 ml. of cold distilled water divided in three portions of 50 ml. each.

The filtration periods are:

|  | Seconds |
|---|---|
| Solution | 40 |
| 1st washing | 75 |
| 2nd washing | 120 |
| 3rd washing | 250 |

Example 2

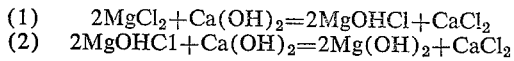

0.05 g. of polyacrylate obtained by saponification of polyacrylonitrile is added to the reactants of Example 1.

|  | Seconds |
|---|---|
| Solution | 25 |
| 1st washing | 40 |
| 2nd washing | 60 |
| 3rd washing | 75 |

In both examples the process is too rapid to allow the reaction to go to completion. In fact, in both instances the dry filter cakes still contain 3.1% Ca.

Instead of increasing the number of washings, it is more convenient to wait for the completion of the reaction by employing longer contact times. Moreover, dilution of the produced $CaCl_2$ in a large volume of washing liquid is thereby avoided. This offers the possibility of recovering the $CaCl_2$ in form of a solution having a concentration substantially identical with that of the magnesium salt solution at the start.

Example 3

The reactants used in Example 1, in the same molar ratio, are kept in contact for 21 minutes while rapidly stirring. The precipitate is washed with 20 ml. of warm $H_2O$ and then with 30 ml. of cold $H_2O$. In this case the filtration rates are:

|  | Seconds |
|---|---|
| Solution | 330 |
| 1st washing | 680 |
| 2nd washing | 1200 |

The washed product contains 70% moisture. The analysis of the dried product indicates 3% Ca and 2% Cl.

Example 4

To the reactants of Example 3, used at the same molar ratio and permitted to react for the same period of time, 0.1 g. of the polyacrylate of Example 2 are added, Washing with the same amounts of water, the filtration rates are:

| | Seconds |
|---|---|
| Solution | 30 |
| 1st washing | 20 |
| 2nd washing | 600 |

The filter cake has a 52% moisture content and, after drying, contains: Cl—3%; Ca=unmeasurable traces.

If magnesium hydroxide is precipitated from very diluted solutions such as when for instance sea-water is employed, the suspension is advantageously first decanted, whereupon the thickened portion is filtered. In the following example, a comparison is made between settling and filtration rate of $Mg(OH)_2$ obtained from sea-water and lime, with and without the addition of polyelectrolytes.

Example 5

500 ml. of sea-water (containing 4.1 g./l. of $MgCl_2$) are reacted, after the elimination of the bicarbonates, for 15 minutes with 10 ml. of a lime suspension (7.4 g./l. Ca) while rapidly stirring.

The suspension obtained in this matter is poured in a cylinder of 60 mm. diameter, and the settling rate is observed. The same experiment is repeated after adding the polyacrylate of Example 2 and the saponification product of a maleic anhydride-vinyl acetate copolymer, in amounts of 0.2 and 0.5%, for the first respectively 0.4% for the second calculated on the theoretical amount of $Mg(OH)_2$.

The following table demostrates the time within which 100 mm. of clear liquid are obtained.

| Polyelectrolyte | 100 mm. of clear liquid obtained after— |
|---|---|
| None | 140 minutes. |
| Polyacrylate, 0.2% | 106 minutes. |
| Polyacrylate, 0.5% | 48 minutes. |
| Saponification product of maleic anhydride-vinyl acetate copolymer, 0.4% | 97 minutes. |

I claim:

1. A process for accelerating the precipitation of magnesium hydroxide and for obtaining a readily filterable product of high purity, which comprises precipitating magnesium hydroxide from a magnesium salt solution with an alkaline-earth base at a molar ratio of about $1/75$ to $1/90$ in the presence of a water-soluble, macromolecular synthetic polyelectrolyte taken from the group consisting of a polyacrylic polyelectrolyte obtained from the saponification of polyacrylonitrile and a water-soluble saponification product of a maleic anhydride-vinyl acetate copolymer.

2. A process for accelerating the precipitation of magnesium hydroxide and for obtaining a readily filterable product of high purity, which comprises precipitating magnesium hydroxide from a magnesium salt solution with an alkaline-earth base at a molar ratio of about $1/75$ to $1/90$ in the presence of a water-soluble saponification product of a maleic anhydride-vinyl acetate copolymer.

3. A process for accelerating the precipitation of magnesium hydroxide and for obtaining a readily filterable product of high purity, which comprises precipitating magnesium hydroxide from a magnesium salt solution with an alkaline-earth base at a molar ratio of about $1/75$ to $1/90$ in the presence of a polyacrylate obtained through the saponification of polyacrylonitrile.

4. A process for accelerating the precipitation of magnesium hydroxide and for obtaining a readily filterable product of high purity, which comprises precipitating magnesium hydroxide from a magnesium salt solution with an alkaline-earth base at a molar ratio of about $1/75$ to $1/90$ in the presence of a polyacrylate obtained through the saponification of polyacrylonitrile and continuing the reaction between magnesium salt and alkaline-earth base until the magnesium salt is substantially fully converted to $Mg(OH)_2$ before filtering and washing.

5. A process for accelerating the precipitation of magnesium hydroxide and for obtaining a readily filterable product of high purity, which comprises precipitating magnesium hydroxide from a magnesium salt solution with an alkaline-earth base at a molar ratio of about $1/75$ to $1/90$ in the presence of a water soluble saponification product of a maleic anhydride-vinyl acetate copolymer and continuing the reaction between magnesium salt and alkaline-earth base until the magnesium salt is substantially fully converted to $Mg(OH)_2$ before filtering and washing.

6. The process of claim 3 in which the magnesium salt is magnesium chloride and the alkaline-earth base is calcium hydroxide.

7. The process of claim 4 in which the magnesium salt is magnesium chloride and the alkaline-earth base is calcium hydroxide.

References Cited in the file of this patent

UNITED STATES PATENTS

| 2,255,422 | Heath et al. | Sept. 9, 1941 |
| 2,625,529 | Heddrick et al. | Jan. 13, 1953 |
| 2,652,380 | Heddrick et al. | Sept. 15, 1953 |

FOREIGN PATENTS

| 547,526 | Great Britain | Sept. 1, 1942 |
| 558,882 | Great Britain | Jan. 26, 1944 |
| 154,799 | Australia | Jan. 19, 1954 |

OTHER REFERENCES

Gardner et al.: "Factors Influencing the Flocculating Capacity of Polyacrylates" (summary of thesis), Mass. Inst. of Technology (1953).

Michaels et al.: "Soil Flocculants and Stabilizers," Agricultural and Food Chemistry, vol. 1, No. 13, Sept. 16, 1953, pages 835 to 843.